(12) United States Patent
Wagner et al.

(10) Patent No.: US 10,145,290 B2
(45) Date of Patent: Dec. 4, 2018

(54) ADJUSTABLE MOUNT FOR AN EXHAUST SYSTEM AND METHOD FOR INSTALLING A MOUNT FOR AN EXHAUST SYSTEM

(71) Applicant: Eberspächer Exhaust Technology GmbH & Co. KG, Neunkirchen (DE)

(72) Inventors: Andreas Wagner, Esslingen (DE); Steffen David, Schorndorf (DE); Christoph Puchta, Quierschied (DE); Benjamin Grün, Schwalbach (DE); Dominik Glage, Hauptstuhl (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 0 days.

(21) Appl. No.: 15/229,526

(22) Filed: Aug. 5, 2016

(65) Prior Publication Data
US 2017/0037767 A1 Feb. 9, 2017

(30) Foreign Application Priority Data

Aug. 7, 2015 (DE) .......................... 10 2015 113 059

(51) Int. Cl.
*F01N 13/08* (2010.01)
*F01N 13/18* (2010.01)
(Continued)

(52) U.S. Cl.
CPC .......... *F01N 13/1805* (2013.01); *B23K 31/02* (2013.01); *B60K 13/04* (2013.01);
(Continued)

(58) Field of Classification Search
CPC ..... F01N 13/1805; F01N 13/08; F01N 13/082
See application file for complete search history.

(56) References Cited

U.S. PATENT DOCUMENTS 4,824,056 A * 4/1989 Wuebker ............. F01N 13/1822
248/60
5,673,877 A * 10/1997 Karner ................ F01N 13/1822
248/58

(Continued)

FOREIGN PATENT DOCUMENTS

DE  60 2005 005 523 T2   4/2009
JP        S57 198316 U     12/1982
(Continued)

*Primary Examiner* — Kevin A Lathers
(74) *Attorney, Agent, or Firm* — McGlew and Tuttle, P.C.

(57) ABSTRACT

A mount (100) for an exhaust system includes a support (110) configured for being fixed to a component of the exhaust system (200) or an underbody of a vehicle, and a mounting mandrel supported by the support (110). The support (110) has a first plate (111) and a second plate (112) spaced apart from the first plate (111). The first plate (111) and the second plate (112) each include a fixing section (113, 114) for fixing the support (110) to a component of the exhaust system (200) or an underbody of a vehicle. The first plate (111) and the second plate (112) each includes an opening (115, 116). The mounting mandrel (120) includes a first section (121) configured for penetrating through an exhaust system rubber (300). The mounting mandrel (120) has a second section (122) that passes through the openings (115, 116) in the first and second plates (111, 112).

17 Claims, 3 Drawing Sheets

(51) Int. Cl.
    *B23K 31/02* (2006.01)
    *B60K 13/04* (2006.01)
(52) U.S. Cl.
    CPC .......... *F01N 13/08* (2013.01); *F01N 13/1811* (2013.01); *F01N 13/1822* (2013.01); *F01N 2450/22* (2013.01); *F01N 2450/28* (2013.01)

(56) References Cited

U.S. PATENT DOCUMENTS

| | | | |
|---|---|---|---|
| 7,510,043 B2 * | 3/2009 | Cerri, III | ............... B60K 13/04 180/296 |
| 8,152,146 B2 * | 4/2012 | Rodecker | ................. F16F 1/50 180/296 |
| 2002/0176739 A1 * | 11/2002 | Goto | ..................... F16B 5/0233 403/301 |
| 2008/0083866 A1 | 4/2008 | Ogimura | |

FOREIGN PATENT DOCUMENTS

| | | |
|---|---|---|
| JP | S62-156 116 U | 10/1987 |
| JP | H04 47127 U | 4/1992 |
| JP | H07 279656 A | 10/1995 |
| JP | H10-258 644 A | 9/1998 |
| JP | H11 342753 A | 12/1999 |

\* cited by examiner

ADJUSTABLE MOUNT FOR AN EXHAUST SYSTEM AND METHOD FOR INSTALLING A MOUNT FOR AN EXHAUST SYSTEM

CROSS REFERENCE TO RELATED APPLICATIONS

This application claims the benefit of priority under 35 U.S.C. § 119 of German Application 10 2015 113 059.9 filed Aug. 7, 2015, the entire contents of which are incorporated herein by reference.

FIELD OF THE INVENTION

The present invention relates to an adjustable mount for an exhaust system and a method for installing a mount for an exhaust system.

BACKGROUND OF THE INVENTION

An exhaust system (also known as exhaust) is comprised of the components exhaust pipes and exhaust boxes (also known as exhaust chambers). Exhaust pipes include, for instance, manifold, Y-pipe, connecting pipe and tail pipe, which may also be provided in plurality. Exhaust boxes include, for instance, mufflers and catalytic converters, which may also be provided in plurality.

Exhaust systems are usually mounted to a vehicle's underbody. The mounting has to compensate for any change in the length of the exhaust system due to temperature expansion at different temperatures. The mounting also has to be effected in a way that the exhaust system will remain stationary with respect to the vehicle's underbody when exposed to vibrations and shocks of the vehicle.

Exhaust systems are usually mounted on a vehicle's underbody by using several suspension points provided at the vehicle's underbody on which O-rings are attached. Corresponding suspension points provided at the exhaust system are inserted into the O-rings. That type of mounting of the exhaust system on the underbody of vehicles quite evidently has a considerable play allowing for the exhaust system to move relative to the vehicle. Traditionally, the suspension points have the form of simple hooks.

Present-day vehicles quite often have covers through which the exhaust system's at least one tail pipe passes. With present-day vehicles, the play resulting from using O-rings mounted in hooks is therefore often no longer tolerable.

It is known to replace simple O-rings by exhaust system rubbers having a solid body with two or more openings formed therein. The openings penetrate the body normally in a way that the hole normals (normal to the plane in which the hole defined by an opening is located) of the openings are parallel. Respective exhaust system rubbers are often made from rubber, silicone or fluoroelastomers. The body of the exhaust system rubbers often has an oval, rhombic, rectangular or even a shamrock like contour and (apart from the openings and the rounding of the edges) a constant thickness.

When using exhaust rubbers, barbed mounting mandrels often form the suspension points, with mounting mandrels fixed to the underbody of the vehicle and to the exhaust system penetrating different openings of the same exhaust system rubbers in pairs. The openings of the exhaust system rubbers are often circular, oval or arched.

When decreasing the play tolerated between the exhaust system and the vehicle's underbody, the accuracy of the arrangement and alignment of the suspension points at the underbody of the vehicle and the components of the exhaust system becomes more important.

SUMMARY OF THE INVENTION

The object of the present invention is therefore to provide a mount (and thus a suspension point) for an exhaust system that is configured for being fixed with little effort and safely to a component of the exhaust system or the underbody of a vehicle and that allows an adjustment of its arrangement and alignment in a simple way. The mount should further be producible at low-cost and versatile.

Embodiments of a mount for an exhaust system comprise a support and a mounting mandrel supported by the support. The support comprises a first plate and a second plate spaced apart from the first plate. A plate is hereby understood as an extensive planar solid body which height (thickness) amounts to not more than 30% or not more than 20% or not more than 10% of the other dimensions of the solid body (length and width). The first and second plates may each be a thin sheet metal having a thickness of between 0.2 mm and 3 mm or between 0.5 mm and 3 mm or a heavy plate having a thickness of more than 3 mm and less than 5 mm. The first and second plates each comprise a fixing section for fixing the support on a component of the exhaust system or on an underbody of a vehicle. This fixing section may, for instance, be formed integrally by bending the respective plate. The support may be attached permanently to a component of the exhaust system (such as an exhaust pipe or an exhaust box) or to an underbody of a vehicle with the fixing sections. Such a permanent attachment of the support on the component of the exhaust system or the underbody of the vehicle may, for instance, be made by welding the fixing section of the first and second plates of the support to the component of the exhaust system or the underbody of vehicle. The first plate and the second plate each comprise an opening. These openings may have identical or different cross-sections. Along the direction of its largest extension, the mounting mandrel comprises a first section configured for penetrating through an exhaust system rubber. The mounting mandrel further comprises a second section that is different from the first section and at which it passes through the openings in the first and second plates of the support. The second section of the mounting mandrel may, for instance, directly adjoin the first section of the mounting mandrel. The openings in the first and second plates of the support thereby have a diameter that is by at least 10% bigger than a diameter of the mounting mandrel in the region, where it passes through the respective opening. Alternatively, the diameter of the openings in the first and second plates of the support is at least 20% bigger than a diameter of the mounting mandrel in the region, where it passes through the respective opening. Further alternatively, the diameter of the openings in the first and second plates of the support is at least 30% bigger than a diameter of the mounting mandrel in the region, where it passes through the respective opening.

Since there exists a considerable play between the mounting mandrel and the openings in the plates of the support, the first section of the mounting mandrel may be aligned precisely even after having the plates of the support fixed to a component of an exhaust system or an underbody of a vehicle. This is based on the idea that at first only the support is fixed permanently to the manufacturing tolerance affected component of the exhaust system or to the manufacturing tolerance affected underbody of the vehicle, and the mounting mandrel is initially inserted loosely into the support. The precise alignment of the mounting mandrel is then done after fixing the plates of the support on the component of the exhaust system or the underbody of the vehicle. This way, the manufacturing tolerances can be compensated for easily.

The fixing sections of the first and second plates of the support may be formed identically or differently. The fixing section may further be separated from other sections of the plates by folds or notches; this is, however, not necessary.

According to an embodiment, the openings in the first and second plates of the support have a diameter that is by not more than 150% bigger than a diameter of the mounting mandrel in the region, where it passes through the respective opening. According to an alternative embodiment, the openings in the first and second plates of the support have a diameter that is by not more than 90% bigger than a diameter of the mounting mandrel in the region, where it penetrates through the respective opening. According to an alternative embodiment, the openings in the first and second plates of the support have a diameter that is by not more than 80% bigger than a diameter of the mounting mandrel in the region, where it penetrates through the respective opening. This way, it is guaranteed that the mounting mandrel received in the openings of the plates of the support may be safely fixed despite the play.

Thereby, the following dependencies of the diameter of the openings in the first and second plates of the support (in the following overview indicated as "DO") from the diameter of the mounting mandrel in the region, where it penetrates the respective opening (in the following overview indicated as "DD"), are possible.

DD+10% DD≤DO≤DD+150% DD, DD+10% DD≤DO≤DD+90% DD, DD+10% DD≤DO≤DD+80% DD, DD+20% DD≤DO≤DD+150% DD, DD+20% DD≤DO≤DD+90% DD, DD+20% DD≤DO≤DD+80% DD, DD+30% DD≤DO≤DD+150% DD, DD+30% DD≤DO≤DD+90% DD, DD+30% DD≤DO≤DD+80% DD

According to an embodiment, the mounting mandrel is, in the region of the openings in the first and second plates of the support, welded to the first and second plates of the support. The welding is made only after fixing the plates of the support to a component of an exhaust system or an underbody of a vehicle, and after aligning the first section of the mounting mandrel. By welding, the mounting mandrel can be kept permanently in the correct position relative to the component of the exhaust system or the underbody of the vehicle.

According to an alternative embodiment, the mounting mandrel comprises, in the second section, two spaced apart metal disks. Each of these metal disks surrounds the mounting mandrel in the peripheral direction completely. According to an embodiment, the metal disks are thereby positioned at the mounting mandrel such that both of the first and second plates of the support are located between the two metal disks. According to another embodiment, the metal disks are thereby positioned at the mounting mandrel such that each one of the first and second plates of the support is located directly adjacent to one of the two metal disks. The metal disks facilitate a safe fixation of the mounting mandrel on the plates of the support, since the fixation of the mounting mandrel can be done indirectly via the metal disks. Since the metal disks surround the mounting mandrel in peripheral direction, they have a bigger diameter than the mounting mandrel. The metal disks may, for instance, have a diameter that is bigger than the diameter of the openings in the first and second plates of the support.

Further, the metal disk that is closer to the first section of the mounting mandrel than the other metal disk may be formed integrally with the mounting mandrel. In this way, the number of parts used can be kept low, since in addition to the support and the mounting mandrel only one single metal disk is necessary.

In case that one of the metal disks is not formed integrally with the mounting mandrel, the metal disk may have a perforation through which the mounting mandrel passes. A diameter of the perforation in the metal disk may, for instance, be slightly bigger than the diameter of the mounting mandrel in the second section. The metal disk may thus, with a play, be put on loosely over the mounting mandrel. According to an embodiment, the diameter of the perforation in the metal disk may, for instance, be between 0.1% to 5% or between 0.5% and 2% bigger than the diameter of the mounting mandrel in the second section.

Alternatively, the perforated metal disk may be joined to the mounting mandrel by frictional connection; the perforated metal disk may thus, for instance, be a clamp washer.

The perforated metal disk may further be joined to the mounting mandrel by welding as soon as the mounting mandrel has been passed through the perforation.

The perforated metal disk may alternatively be joined to the mounting mandrel by brazing as soon as the mounting mandrel has been passed through the perforation.

The perforated metal disk may further alternatively be joined to the mounting mandrel by adhesive bonding as soon as the mounting mandrel has been passed through the perforation.

According to an embodiment, each of the metal disks is welded to that of the first and second plates of the support that is most vicinal to it. The welding is only done after fixing the plates of the support to a component of an exhaust system or an underbody of a vehicle, after passing the mounting mandrel through the openings in the plates, and after aligning the first section of the mounting mandrel.

According to an embodiment, the hole normals of the openings in the first and second plates of the support are spaced apart. The hole normals of the openings in the first and second plates of the support may be spaced apart parallelly or skewed with respect to each other, or intersect at an angle. The mounting mandrel may thereby extend straight in the first section and S-shaped in the second section. The curvature of the S-shaped form of the mounting mandrel may, for instance, be completely positioned between the plates of the support. The S-shaped form of the mounting mandrel facilitates a safe alignment and attachment of the mounting mandrel on the plates of the support despite the large play between the mounting mandrel and the plates of the support.

According to an embodiment, the first and second plates of the support are in parallel. According to an alternative embodiment, the first and second plates of the support are in planes confining an angle of less than 20° or an angle of less than 10° or an angle of less than 5°. In this way, it is guaranteed that the hole normals of the openings in the first and second plates of the support are aligned substantially along the same direction.

According to an embodiment, the mounting mandrel and the openings in the first and second plates of the support have a circular cross-section. According to an alternative embodiment, the mounting mandrel and the openings in the first and second plates of the support have an oval cross-section. According to a further alternative embodiment, the mounting mandrel and the openings in the first and second plates of the support have a triangular cross-section. According to a further alternative embodiment, the mounting mandrel and the openings in the first and second plates of the support have a tetragonal cross-section. According to a further alternative embodiment, the mounting mandrel and the openings in the first and second plates of the support have a polygonal cross-section. The shape of the cross-section of the mounting mandrel may thus correspond to the shape of the cross-section of the openings in the first and second plates of the support. When using a non-circular cross-section, an extreme twisting of the mounting mandrel relative to the plates can be prevented, provided that a largest diameter of the mounting mandrel is smaller than a smallest diameter of the opening in the first and second plates of the support.

According to an embodiment, the mounting mandrel comprises two spaced apart protrusions in the first section. Thereby, the protrusion located farther away from the second section of the mounting mandrel than the other protrusion comprises a ramp on the side of the protrusion facing away from the second section of the mounting mandrel. The ramp facilitates an insertion of the mandrel into an opening of an exhaust system rubber, while enabling to prevent the mounting mandrel from disengaging from the opening of the exhaust system rubber.

According to an embodiment, the distance between the first and second plates of the support is larger than 30 mm or larger than 60 mm or larger than 90 mm. According to an embodiment, the distance between the first and second plates of the support is smaller than 200 mm or smaller than 150 mm or smaller than 100 mm. Thereby, the following dimensioning for the distance (in the following overview indicated as "AB") are possible:

30 mm<AB<200 mm, 30 mm<AB<150 mm, 30 mm<AB<100 mm,
60 mm<AB<200 mm, 60 mm<AB<150 mm, 60 mm<AB<100 mm,
90 mm<AB<200 mm, 90 mm<AB<150 mm, 90 mm<AB<100 mm

According to an embodiment, the carrier is formed integrally from sheeting and a connecting section interconnects the first and second plates of the support. The support may then be made through deep drawing or bending of a single sheet metal part. By forming the support integrally, the number of parts used is further reduced.

According to an embodiment, the fixing section of the first plate of the support is aligned in parallel to said first plate, whereby the first plate is located closer to the first section of the mounting mandrel than the second plate of the support. Thereby, the fixing section may, for instance, be joined S-shaped. The fixing section of the second plate of the support further confines with said second plate an angle of more than 60° or an angle of more than 80° or an angle of more than 90°, whereby the second plate is spaced farther away from the first section of the mounting mandrel than the first plate of the support. The fixing sections of the first and second plates of the support thus have different orientations. In this way, the fixing section of the first plate of the support may, for instance, be fixed on a front face of an exhaust box, while the fixing section of the second plate of the support is fixed to a side face of the same exhaust box. The exhaust box is thereby held safely.

According to an embodiment, the fixing section of the first plate of the support is spaced apart at least as twice as far from the opening in the first plate than the fixing section of the second plate of the support is spaced apart from the opening in the second plate, whereby said first plate is located closer to the first section of the mounting mandrel than the second plate of the support. With such a different dimensioning, the support is well suited for absorbing torque.

According to an embodiment, the support and mounting mandrel are made of metal or stainless steel. Also the metal disks may be made of stainless steel.

According to an embodiment, the first and second plates are formed identically. According to an alternative embodiment, the first and second plates differ only in the position of the opening.

Embodiments of a method for installing a mount for an exhaust system comprise the following steps: welding a first fixing section of a first plate of a support to a component of the exhaust system or to an underbody of the vehicle. Welding a second fixing section of a second plate of the support to the component of the exhaust system or the underbody of the vehicle such that both, the first and second plates are spaced apart, and such that the first and second plates are both in parallel or in planes confining an angle of less than 20°. Placing a second section of a mounting mandrel carrying a first metal disk in openings formed in the plates of the support such that the first metal disk is positioned outside the two plates of the support, with the mounting mandrel comprising a first section configured to penetrate through an exhaust system rubber, and with the openings in the plates of the support having a diameter that is by at least 10% bigger than a diameter of the mounting mandrel in the region, where it passes through the respective opening. Placing a second metal disk having a central passage onto the mounting mandrel such that the two plates of the support are located between the first and second metals disks, with each of the metal plates abutting a corresponding plate of the support. Aligning the first section of the mounting mandrel with respect to the component of the exhaust system or to the underbody of the vehicle. And, welding the metal disks to the corresponding plates and to the mounting mandrel.

In this context, it is noted that the terms "including", "comprising", "containing", "having" and "with", as well as grammatical modifications thereof used in this specification or the claims for listing features, are generally to be considered to specify a non-exhaustive listing of features such as method steps, components, ranges, dimensions or the like, and do by no means preclude the presence or addition of one or more other features or groups of other or additional features.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

In the exemplary embodiments described below, components that are alike in function and structure are designated as far as possible by alike reference numerals. Therefore, to understand the features of the individual components of a specific embodiment, the descriptions of other embodiments and of the summary of the disclosure should be referred to.

Figure 1A:
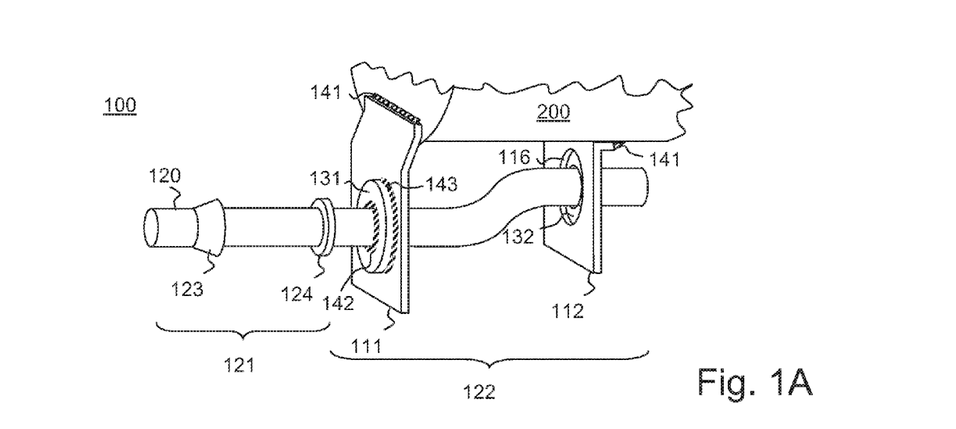
FIG. 1A is a perspective view showing a schematic illustration of a mount according to a first embodiment mounted to a muffler.

Referencing FIGS. 1A to 1D, a first embodiment of an adjustable mount for an exhaust system is described below. FIG. 1A hereby shows the mount in a fully installed state, FIG. 1B components of the mount in an non-installed state, FIG. 1C the mount in a state, where only first and second plates are fixed to a component of an exhaust system, and FIG. 1D a cross-section through an installed mount according to FIG. 1A, though the component of the exhaust system is not shown and a cross-section through the exhaust system rubber is shown in addition. In the figures, components presented transparently are illustrated with dotted lines.

Figure 1B:
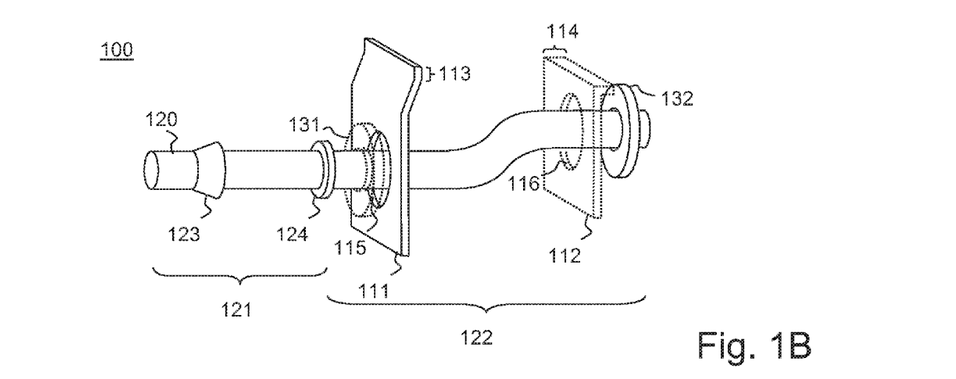
FIG. 1B is a perspective view showing a schematic illustration of the mount from FIG. 1A before being mounted to the muffler with the components plotted in dashed lines shown transparently.
Figure 1C:
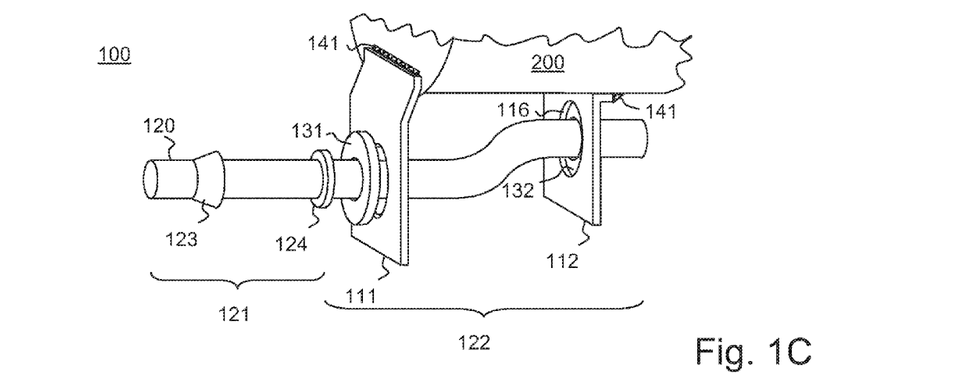
FIG. 1C is a perspective view showing a schematic illustration of the mount from FIG. 1A upon being mounted to the muffler.
Figure 1D:
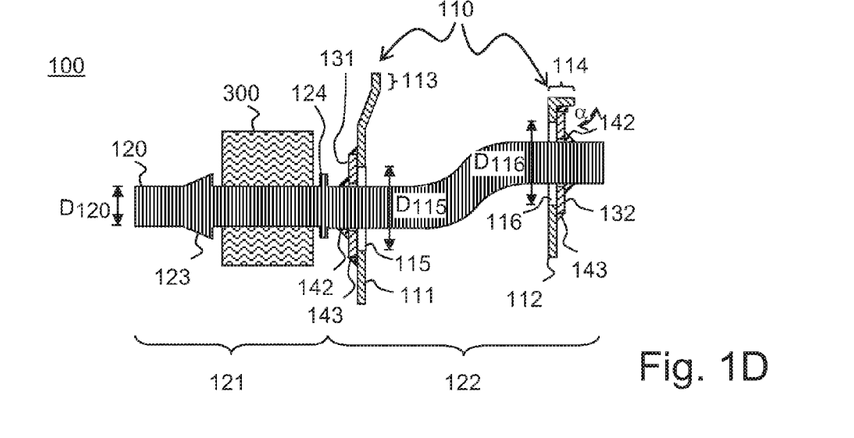
FIG. 1D is a cross-sectional view through the mount from FIG. 1B with an additionally illustrated exhaust system rubber.

As is particularly evident from FIGS. 1B and 1D, the mount 100 comprises a mounting mandrel 120 having a circular cross-section. In the embodiment shown, the mounting mandrel 120 is made of solid steel.

The mounting mandrel 120 comprises a first section 121 along which it extends linearly and within which a first protrusion 123 having a ramp-shaped cross-section and a second protrusion 124 of rectangular cross-section are formed. The two first and second protrusions 123 and 124 are spaced such that an exhaust system rubber 300 penetrated by a mounting mandrel 120 may be disposed between them. The ramp-shaped cross-section of the first protrusion 123 thereby facilitates insertion of the mounting mandrel 120 into an opening in the exhaust system rubber 300. The opening in the exhaust system rubber 300 is not visible in FIG. 1D, since the exhaust system rubber 300 embraces the mounting mandrel 120 tightly due to its elasticity. The first and second protrusions 123 and 124 prevent the mounting mandrel from an excessive relative movement with respect to the exhaust system rubber 300. In the embodiment shown, the first and second protrusions 123 and 124 are formed integrally with the mounting mandrel 120.

In a second section 122 located, in a longitudinal direction of the mounting mandrel, adjacent to the first section 121, the mounting mandrel 120 has an S-shaped characteristic and a constant cross-section; in the second section 122, the mounting mandrel 120 is thus devoid of protrusions.

The mount 100 further comprises a support 110, formed by a first plate 111 and a second plate 112. In the embodiment shown, both, the first and second plates 111, 112 are made from thin steel sheet having a material thickness of 3 mm. The cross-section of the first plate 111 is all in all S-shaped. A first fixing section 113 of the first plate 111 of the support 110 runs in parallel to a section of the first plate 111 having an opening 115 formed therein. The second plate 112 has an angled fixing section 114 being at an angle α of 90° with respect to a section of the second plate 112 having an opening 116 formed therein. The fixing section 114 of the second plate 112 is also at right angles to the fixing section 113 of the first plate 111. The fixing sections 113, 114 serve to fasten the first and second plates 111, 112 of the support 110 onto a component of an exhaust system as shown in FIGS. 1A and 1C.

As can be seen from FIGS. 1A and 1C, the fixing section 113 of the first plate 111 is fastened by a weldseam 141 on a front face of an exhaust box 200, while the fixing section 114 of the second plate 112 is fastened by a weldseam 141 on a lateral face of the exhaust box 200. With the first and second plates 111, 112 being fixed to the exhaust box 200, the first and second plates 111, 112 of the support are arranged in parallel.

Alternatively to being fixed to a component of an exhaust system, the fixing sections 113, 114 of the support 110 may also be fixed to an underbody of a vehicle. This is, however, not shown in the figures. In the embodiment shown, the first and second plates are further formed differently. The present invention is, however, not limited to this, so that the first and second plates may alternatively also be formed identically. The first and second plates may, for example, alternatively also both have an angled fixing section.

Each of the first and second plates 111, 112 of the support 110 has an opening 115, 116 penetrating the respective plate completely. In the mounted state of the mount 100 shown in FIGS. 1A and 1D, the mounting mandrel 120 penetrates the openings 115, 116 of the first and second plates 111, 112 of the support 110. The diameter $D_{115}$ of the opening 115 formed in the first plate 111 is with 18 mm thereby 87% bigger than a diameter $D_{120}$ of the mounting mandrel 120 having 9.6 mm in the region where it penetrates the first plate 111. Also the opening 116 in the second plate 112 of the support 110 has a diameter $D_{116}$ which is with 18 mm 87% bigger than the diameter $D_{112}$ of the mounting mandrel 120 having 9.6 mm in the region where it penetrates the second plate 112. When the mounting mandrel 120 penetrates the openings 115 and 116 of the first and second plates 111, 112 of the support 110, the mounting mandrel 120 is thus supported by the plates 111, 112 of the support 110 with a play. Consequently, the mounting mandrel 120 may be aligned in a direction longitudinal to the openings 115, 116 (and thus along the longitudinal direction of the mounting mandrel 120), but also in a direction transverse to the openings 115, 116 (and thus in a direction perpendicular to the longitudinal direction of the mounting mandrel 120). The mounting mandrel 120 may also be tilted. As can be seen from FIGS. 1A and 1D, the hole normal of the openings 115 and 116 in the first and second plates 111, 112 of the support 110 are in parallel. The centers of the openings 115, 116 of the first and second plates 111, 112 are not located along a common hole normal so that the openings 115, 116 are positioned offset.

The mount 100 further comprises a first metal disk 131 and a second metal disk 132. In this embodiment, the first and second metal disks 131 and 132 each comprise an opening being slightly bigger than the diameter $D_{120}$ of the mounting mandrel 120 and represent components that are independent of the mounting mandrel 120. As shown in FIGS. 1B, 1C, and 1D, the mounting mandrel 120 penetrates the first and second metal disks 131, 132 such that the first and second plates 111, 112 of the support 110 are located between the first and second metal disks 131, 132. In the embodiment shown, the diameter of each of the two metal disks 131 and 132 is with 25 mm bigger than the diameter $D_{115}$, $D_{116}$ of the openings 115, 116 in the first and second plate 111, 112 of the support 110.

To define the mounting mandrel 120 in its alignment and position with respect to the first and second plates 111, 112 of the support 100 when the first and second plates are, for example, fastened on an exhaust box 200, the first and second metal plates 131, 132 are, after the mounting mandrel has been aligned, brought into abutment with the respective first and second plates 111, 112 and welded to the first and second plates 111, 112 by means of weldseams. Thereafter, the mounting mandrel 120 is welded to the first and second metal disks 131, 132 by annular weldseams. As a result, position and orientation of the mounting mandrel 120 are fixed permanently with respect to the first and second plates 111, 112. Alternatively, the mounting mandrel 120 may first be welded to the first and second metal disks 131, 132, and the first and second metal disks may thereafter be welded to the first and second plates 111, 112 of the support 110.

Referencing FIGS. 2A and 2B, a second embodiment of the mount 100' for an exhaust system according to the invention will be described below.

Figure 2A:
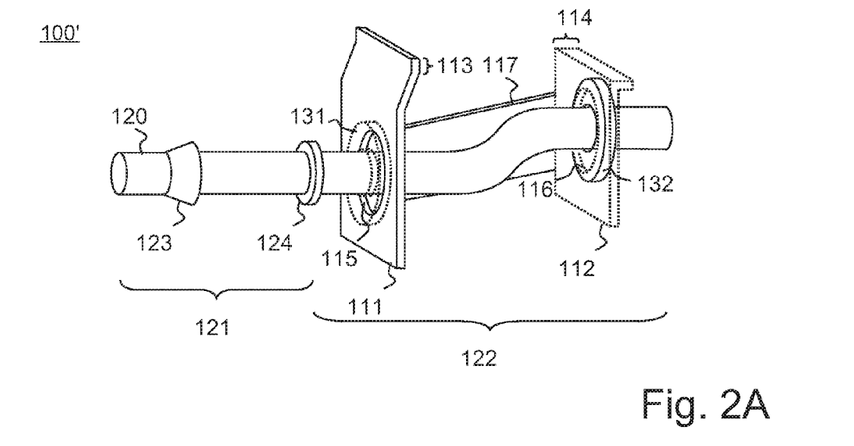
FIG. 2A is a perspective view showing a schematic illustration of a mount according to a second embodiment with the components plotted in dashed lines shown transparently.
Figure 2B:
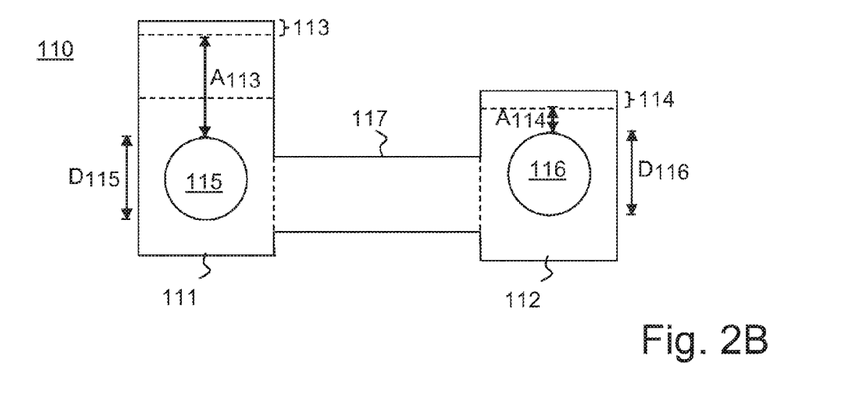
FIG. 2B is a view showing a support of the mount from FIG. 2A in a state developed into a plane.

The schematic perspective view of FIG. 2A thereby illustrates the mount in a non-installed state, while FIG. 2B illustrates a support of the mount used in FIG. 2A in a state, where the support is developed into a plane. To avoid any repetition, only differences to the above first embodiment are addressed, and for the rest reference is made to the explanations of the first embodiment.

The mount 100' according to the second embodiment differs from the mount 100 according to the first embodiment described above in that the first metals disk 131 is not put loosely onto the mounting mandrel 120, but formed integrally with the mounting mandrel 120. This reduces the number of parts used.

The second embodiment differs from the first embodiment described above further in that the second metal disk 132 does also not run loosely along the mounting mandrel 120, but is configured as a clamp washer and thus attached to the mounting mandrel by frictional connection. To achieve this, the diameter of the opening in the second metal disk 132 is slightly smaller than the diameter $D_{120}$ of the mounting mandrel 120. In the vicinity of the opening, the second metal disk 132 has elastic properties.

The second embodiment differs from the first embodiment described above further in that the support 110 according to the second embodiment is formed integrally. This is to be seen best in FIG. 2B. A connecting section 117 interconnects the first and second plates 111, 112 of the support. This allows the support 110 to be made by bending a piece of metal sheet (or thin plate). The bending edges are shown as dashed lines in FIG. 2B.

Referencing FIG. 2B, the fixing section 113 of the first plate 111 of the support 110 is spaced from the opening 115 in the first plate 111 by a distance $A_{113}$. In the second embodiment this distance $A_{113}$ is like in the first embodiment described above considerably bigger than a distance $A_{114}$ between the fixing section 114 of the second plate 112 of the support 110 and the opening 116 in the second plate 112 of the support 110. This allows to fix one of the fixing sections 113, 114 on the front face and the other on the lateral face of the exhaust box 200 as shown in FIGS. 1A and 1C. In FIG. 2B, the distance $A_{113}$ between the fixing section 113 and the opening 115 in the first plate 111 is four times the distance $A_{114}$ between the fixing section 114 and the opening 116 in the second plate 112.

The installation of the mount according to one of the first and second embodiment is performed as described below.

First, the fixing sections 113, 114 of the first and second plates 111, 112 of a support 110 are fixed to a component of an exhaust system 200 or to the underbody of a vehicle (not shown). This may, for instance, be accomplished by welding or adhesive bonding or brazing. This is done in a way, where the first and second plates 111, 112 are in parallel or in planes confining an angle of less than 20°. Next, a first metal disk 131 is slid onto a mounting mandrel 120, provided that a respective first metal disk 131 has not already been formed integrally with the mounting mandrel 120. Then, the mounting mandrel 120 carrying the first metal disk 131 is inserted through the openings 115, 116 in the first and second plates 111, 112 of the support 110. After that, a second metal disk 132 is slid onto the mounting mandrel 120, with the second metal disk 132 thus surrounding the mounting mandrel 120 in a peripheral direction and the first and second plates 111, 112 being positioned between the first and second metal disks 131, 132. Thereafter, position and orientation of the mounting mandrel 120 are aligned as required for suspending the exhaust system. After this, the first and second metal disks 131, 132 are brought into abutment with the respective first and second plates 111, 112 and welded to the adjacent first and second plates 111, 112 and the mounting mandrel 120 annularly.

Referencing FIGS. 3A to 3C, a third embodiment of an adjustable mount for an exhaust system is described below.

Figure 3A:
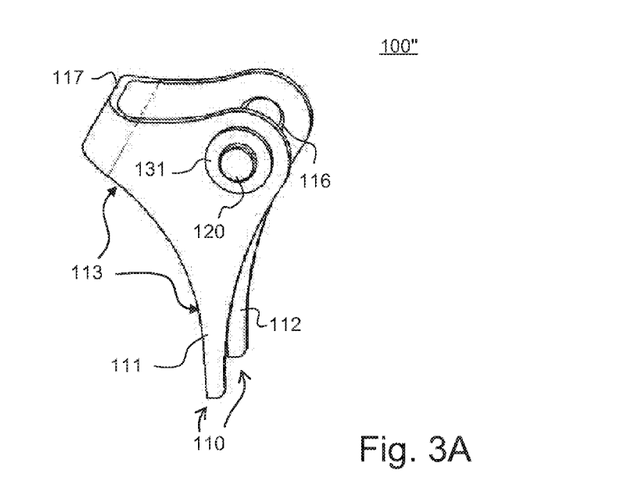
FIG. 3A is a perspective view showing a schematic illustration of a mount according to a third embodiment.
Figure 3B:
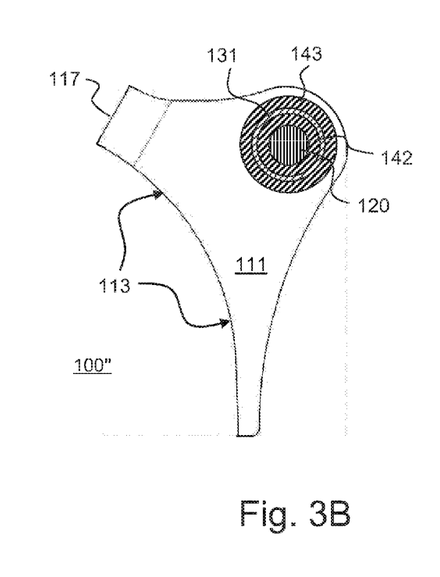
FIG. 3B is a side view showing a schematic illustration of the mount from FIG. 3A.
Figure 3C:
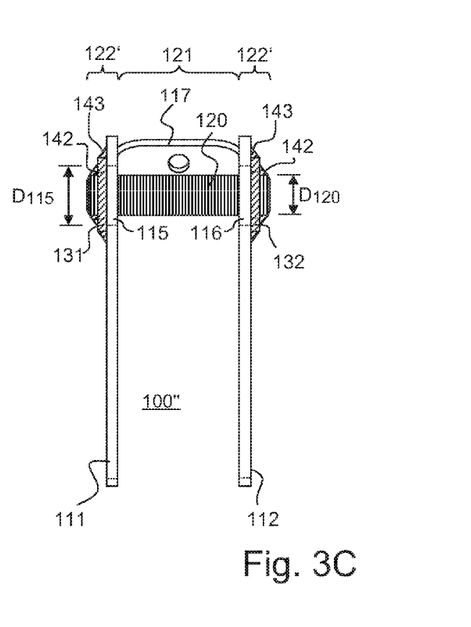
FIG. 3C is a side view showing a schematic illustration of the mount from FIG. 3A.

FIG. 3A thereby shows a perspective view of the mount 100" in a fully installed state, FIG. 3B a side view of the mount 100", with the mount 100" being aligned such that a first plate 111 of the mount 100" is in the plane of projection, and FIG. 3C a further side view of the mount 100", with the mount 100" being aligned such that the first plate 111 and a second plate 112 of the mount 100" is perpendicular to the plane of projection. To facilitate a better understanding of the invention, selected elements are shown hatched in FIGS. 3B and 3C. As in the first and second embodiments described above, the same hatch has been used for the same elements. Furthermore, openings 115, 116 in the first and second plates 111, 112 have been marked by dotted lines.

As can be seen best in FIGS. 3A and 3C, the mount 100" comprises a mounting mandrel 120 in form of a straight bolt having a circular cross section. Different to the above first and second embodiments, in the third embodiment, a first section 121 of the mounting mandrel 120 configured for penetrating through an exhaust system rubber (not shown) is not located next to a support 110 of the mount 100", but inside the support 110. For this purpose, the mounting mandrel 120 comprises two spaced apart sections 122', at which the mounting mandrel 120 penetrates through two symmetrically formed, parallel first and second plates 111, 112 of the support 110. Hereto, the first and second plates 111, 112 of the support each comprise openings 115, 116 through which the mounting mandrel 120 passes. The first section 121 of the mounting mandrel 120 is thus located between the two second sections 122' of the mounting mandrel 120. Instead of penetrating through an exhaust system rubber of an exhaust system, the first section 121 of the mounting mandrel 120 may also engage a hook that is coupled to the underbody of a vehicle by means of a tolerance element (such as a spring).

Like in the second embodiment, the first and second plates 111, 112 forming the support 110 of the third embodiment are configured integrally and are interconnected by a connecting section 117.

In the third embodiment, the first and second plates 111, 112 each have a fixing section 113, extending along a curved outer edge of the first and second plates 111, 112. In FIGS. 3A, 3B, and 3C, only the fixing section 113 of the first plate 111 is visible, since the fixing section of the second plate 112 is hidden by the first plate 111. The curvature of the fixing sections is adapted to a housing of an exhaust converter (not shown).

As in the first and second embodiments, the openings 115, 116 in the first and second plates 111, 112 of the support 110 each have a diameter of the same size $D_{115}$, which is bigger by at least 10% than a diameter $D_{120}$ of the mounting mandrel 120 in the region, where it passes through the first plate 111 and the second plate 112. The plates 111, 112 of the support 110 thus support the mounting mandrel 120 with a play, when the mounting mandrel 120 penetrates through the openings 115 and 116 of the first and second plates 111, 112 of the support 110. Resulting from this, the mounting mandrel 120 can be aligned in a direction transverse to the openings 115, 116 (and thus in a direction perpendicular to the longitudinal direction of the mounting mandrel 120). The centers of the openings 115, 116 of the first and second plates 111, 112 are obviously arranged along a common hole normal so that the openings 115, 116 are aligned with each other.

Like in the first and second embodiments, also in the third embodiment, the mount 100″ comprises a first metal disk 131 and a second metal disk 132. Also in the third embodiment each metal disk 131 and 132 has an opening that is slightly bigger than the diameter $D_{120}$ of the mounting mandrel 120 and constitutes a component independent from the mounting mandrel 120. As shown in FIGS. 3A and 3C, the mounting mandrel 120 passes through the first and second metal disks 131, 132 such that the first and second plates 131, 132 of the support 110 are located between the first and second metal disks 131, 132. In the embodiment shown, the two metal disks each have a diameter that is bigger than the diameter $D_{115}$ of the openings 115, 116 in the first and second plates 111, 112 of the support 110.

For defining orientation and position of the mounting mandrel 120 with respect to the first and second plates 111, 112 of the support 110 when the first and second plates 111, 112 are, for instance, fixed to an exhaust box 200, the first and second metal plates 131, 132 are brought into abutment with the respective adjacent first and second plates 111, 112 after the mounting mandrel 120 has been aligned, and are then welded by annular weldseams 143 to the first and second plates 111, 112. Then, the mounting mandrel 120 is welded to the first and second metal disks 131, 132 by annular weldseams 142. This results in the position and orientation of the mounting mandrel 120 with respect to the first and second plates 111, 112 being defined permanently. Alternatively, the mounting mandrel 120 may also be welded to the first and second metal disks 131, 132 first, with the first and second metal disks 131, 132 being welded to the first and second plates 111, 112 of the support 110 later.

The mount 100″ according to the third embodiment is particularly suited for an installation of heavy components of an exhaust system such as those used by heavy goods vehicles, for example.

While specific embodiments of the invention have been shown and described in detail to illustrate the application of the principles of the invention, it will be understood that the invention may be embodied otherwise without departing from such principles.

LIST OF REFERENCE SIGNS

100 mount for an exhaust system
100′ mount for an exhaust system
100″ mount for an exhaust system
110 support
111 first plate of the support
112 second plate of the support
113 fixing section of the first plate of the support
$A_{113}$ distance between the fixing section and the opening in the first plate
114 fixing section of the second plate of the support
$A_{114}$ distance between the fixing section and the opening in the second plate
α angle confined by the fixing section of the second plate
115 opening in the first plate of the support
$D_{115}$ diameter of the opening in the first plate of the support
116 opening in the second plate of the support
$D_{116}$ diameter of the opening in the second plate of the support
117 connecting section
120 mounting mandrel
$D_{120}$ diameter of the mounting mandrel
121 first section of the mounting mandrel
122 second section of the mounting mandrel
122′ second section of the mounting mandrel
123 first protrusion of the mounting mandrel
124 second protrusion of the mounting mandrel
131 first metal disk
132 second metal disk
141 weldseam between support and component of the exhaust system
142 weldseam between mounting mandrel and metal disk
143 weldseam between metal disk and plate of support
200 component of an exhaust system
300 exhaust system rubber

What is claimed is:

1. A mount for an exhaust system, the mount comprising:
a support configured for being fixed to a component of the exhaust system or to an underbody of a vehicle, the support comprising a first plate and a second plate spaced apart from the first plate, each of the first plate and the second plate comprising a fixing section for fixing the support to the component of the exhaust system or to the underbody of a vehicle, each of the first plate and the second plate comprising an opening; and
a mounting mandrel supported by the support, the mounting mandrel comprising a first section configured to penetrate through an exhaust system rubber, and a second section in which the mounting mandrel penetrates the opening in the first plate and the opening of the second plate, the opening in the first plate and the opening in the second plate having a diameter that is by at least 10% greater than a diameter of the mounting mandrel at a region of the mounting mandrel, the region of the mounting mandrel being located at a position, where the mounting mandrel penetrates through a respective opening, wherein the mounting mandrel comprises two spaced apart metal disks in the second section, each of the metal disks surrounding the mounting mandrel, the opening in the first plate being offset from the opening in the second plate in an axial direction with respect to a longitudinal axis of the mounting mandrel, wherein at least one of:

the first plate and the second plate of the support are located between the two metal disks; and each one of the first plate and the second plate of the support is located directly adjacent to one of the two metal disks.

2. A mount according to claim 1, wherein the opening in the first plate and the opening in the second plate of the support have a diameter that is by not more than 150% greater than the diameter of the mounting mandrel at the region of the mounting mandrel, the region of the mounting mandrel being located at a position, where the mounting mandrel penetrates through the respective opening.

3. The mount according to claim 1, wherein the mounting mandrel is welded to the first plate and the second plate of the support at the regions of the mounting mandrel, the regions of the mounting mandrel being located at positions of the opening in the first plate and the opening in the second plate.

4. The mount according to claim 1, wherein one of the metal disks located closer to the first section of the mounting mandrel than another one of the metal disks is formed integrally with the mounting mandrel.

5. The mount according to claim 1, wherein one or more of:

at least one of the metal disks is joined to the mounting mandrel by a frictional connection;

at least one of the metal disks is joined to the mounting mandrel by a welded connection;

at least one of the metal disks is joined to the mounting mandrel by a brazed connection; and at least one of the metal disks is joined to the mounting mandrel by an adhesive bonding connection.

6. The mount according to claim 1, wherein each of the metal disks is welded to one of the first plate and the second plate, each of the metal disks being located adjacent to one of the first plate and the second plate.

7. The mount according to claim 1, wherein a hole normal of the opening in the first plate and a hole normal of the opening in the second plate are spaced apart, the mounting mandrel extending straight in the first section and the mounting mandrel extending S-shaped in the second section.

8. The mount according to claim 1, wherein one of:

the first plate is parallel to the second plate; and the first plate and the second plate are in planes that confine an angle of less than 20°.

9. The mount according to claim 1, wherein one of:

the mounting mandrel and the opening in the first plate and the opening in the second plate have a circular cross-section;

the mounting mandrel and the opening in the first plate and the opening in the second plate have an oval cross-section;

the mounting mandrel and the opening in the first plate and the opening in the second plate have a triangular cross-section;

the mounting mandrel and the opening in the first plate and the opening in the second plate have a tetragonal cross-section; and the mounting mandrel and the opening in the first plate and the opening in the second plate have a polygonal cross-section.

10. The mount according to claim 1, wherein the mounting mandrel comprises two spaced apart protrusions in the first section, one of the protrusions being arranged farther from the second section of the mounting mandrel than another one of the protrusions, the one of the protrusions arranged farther from the second section of the mounting mandrel comprising a ramp at a side of the one of the protrusions facing away from the second section of the mounting mandrel.

11. The mount according to claim 1, wherein the support is formed in one piece from a metal sheet, and a connecting section interconnects the first plate and the second plate of the support.

12. The mount according to claim 1, wherein the fixing section of the first plate of the support is oriented parallel to the first plate, the first plate being located closer to the first section of the mounting mandrel than the second plate of the support, wherein the fixing section of the second plate of the support confines together with the second plate an angle of more than 60° or an angle of more than 80° or an angle of 90°, said second plate being spaced farther away from the first section of the mounting mandrel than the first plate of the support.

13. The mount according to claim 1, wherein the fixing section of the first plate of the support is spaced apart at least as twice as far from the opening in the first plate than the fixing section of the second plate of the support is spaced apart from the opening in the second plate, whereby the first plate is located closer to the first section of the mounting mandrel than the second plate of the support.

14. A mount for an exhaust system, the mount comprising:

a support configured for being fixed to a component of the exhaust system or to an underbody of a vehicle, the support comprising a first plate and a second plate spaced apart from the first plate, the first plate comprising a first plate fixing section for fixing the support to the component of the exhaust system or to the underbody of a vehicle, the first plate further comprising a first plate opening, the second plate comprising a second plate fixing section for fixing the support to the component of the exhaust system or to the underbody of a vehicle, the second plate further comprising a second plate opening; and a mounting mandrel supported by the support, the mounting mandrel comprising a first section configured to extend through an exhaust system rubber, and said mounting mandrel comprising a second section, one portion of the second section arranged at or adjacent to the first plate opening and another portion of the second section being arranged at or adjacent to the second plate opening, the first plate opening and the second plate opening having a diameter that is by at least 10% greater than a diameter of each of the one portion of the second section of the mounting mandrel and the another portion of the second section of the mounting mandrel, wherein the mounting mandrel comprises two spaced apart metal disks in the second section, each of the metal disks surrounding the mounting mandrel, the opening in the first plate being offset from the opening in the second plate in an axial direction with respect to a longitudinal axis of the mounting mandrel, wherein at least one of:

the first plate and the second plate of the support are located between the two metal disks; and each one of the first plate and the second plate of the support is located directly adjacent to one of the two metal disks.

15. A mount according to claim 14, wherein the first plate opening and the second plate opening have a diameter that is by not more than 150% greater than the diameter of each of the one portion of the second section of the mounting mandrel and the another portion of the second section of the mounting mandrel.

16. The mount according to claim 14, wherein the mounting mandrel is welded to the first plate and the second plate of the support at the regions of the mounting mandrel, the regions of the mounting mandrel being located at positions of the first plate opening and the second plate opening.

17. The mount according to claim 14, wherein one of the metal disks located closer to the first section of the mounting mandrel than another one of the metal disks is formed integrally with the mounting mandrel.

* * * * *